May 15, 1951        R. E. BARNETT        2,553,073
SOLAR HEATER WITH SPACED PARALLEL
HEAT ABSORBING SHEETS

Filed Nov. 12, 1947        2 Sheets-Sheet 1

Inventor
Roy Everett Barnett

By *Clarence A. O'Brien
and Harvey B. Jacobson*
Attorneys

May 15, 1951 — R. E. BARNETT — 2,553,073
SOLAR HEATER WITH SPACED PARALLEL HEAT ABSORBING SHEETS
Filed Nov. 12, 1947 — 2 Sheets-Sheet 2

Inventor
Roy Everett Barnett

Patented May 15, 1951

2,553,073

UNITED STATES PATENT OFFICE 2,553,073

SOLAR HEATER WITH SPACED PARALLEL HEAT ABSORBING SHEETS

Roy Everett Barnett, Wauchula, Fla.

Application November 12, 1947, Serial No. 785,405

4 Claims. (Cl. 126—271)

This invention relates to a sunray or solar heater, and the object thereof is to provide a novel and simple means for heating water for domestic use from the heat of the sun's rays or the use of the heat for refrigeration, air conditioning, or to heat the air for house heating units.

Another object is to provide a solar heater including a novel and efficient heat trap or unit which embodies a wood or metal box properly inclined, with a bottom of insulation, a glass top or cover, an air inlet at the bottom and a thermostatic damper controlled air outlet at the top, the heater proper comprising sheets or layers of glass or copper arranged in stepped relation, preferably three layers, with the bottom layer of copper or glass painted black, and two clear glass layers above the same to heat the air passing between the layers or glass plates which is used to heat water in a coil or radiator connected to a storage tank having an inlet for cold water from a suitable supply under pressure and an outlet for the heated water which is heated on circulating through the heating coil or radiator, and for other purposes.

Another object is to provide a damper controlling the outlet of heated air from the top of the trap or heating unit, which is thermostatically controlled to open when the air is hot and to close when the air is cold, and to provide for the recirculation of the air after the heat thereof is used to heat the water in the radiator or coil, or for other purposes.

Other objects and advantages and the details of construction and operation will be hereinafter described, reference being had to the accompanying drawings, in which:

Figure 3 is an enlarged section taken on the line 3—3 of Figure 1; and

Figure 1:
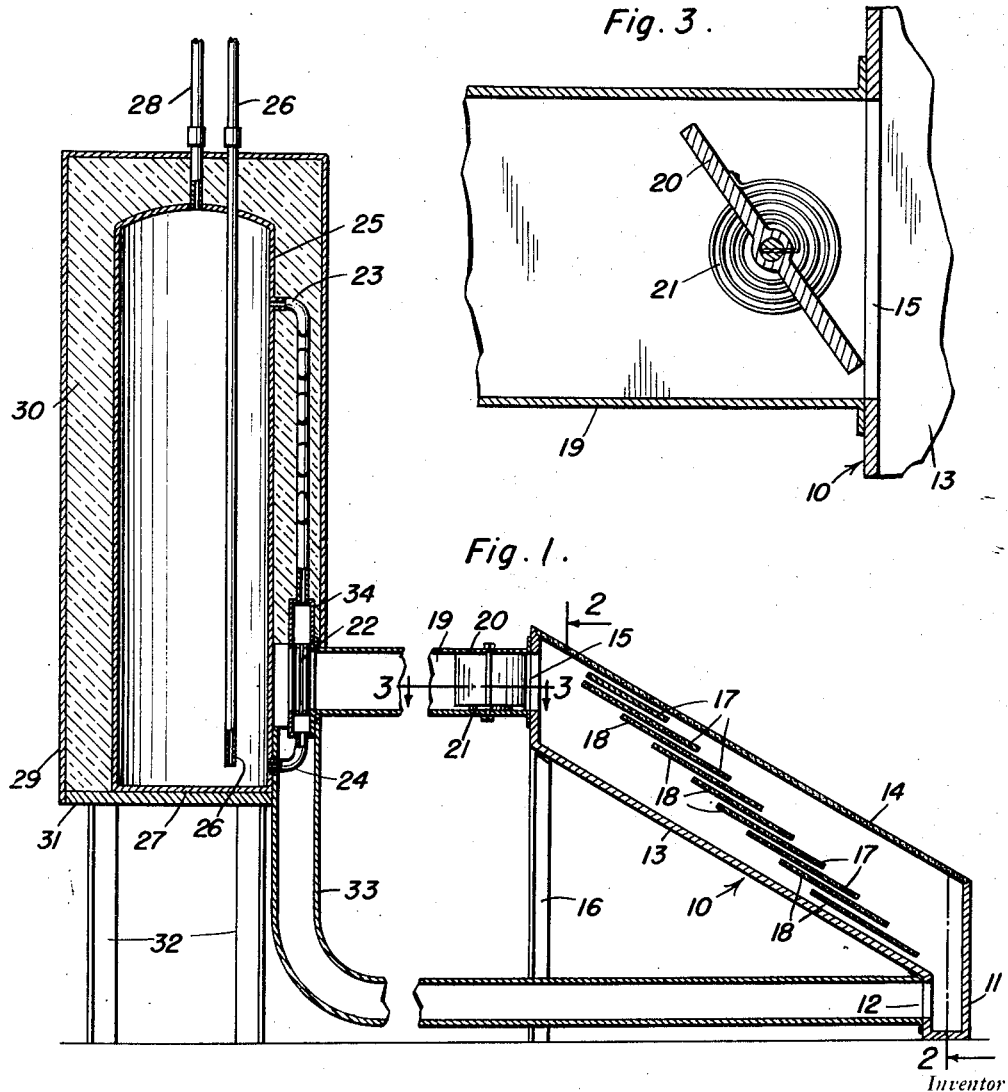
Figure 1 is a vertical sectional view of a sunray or solar heater, constructed in accordance with the invention to heat water.
Figure 2:
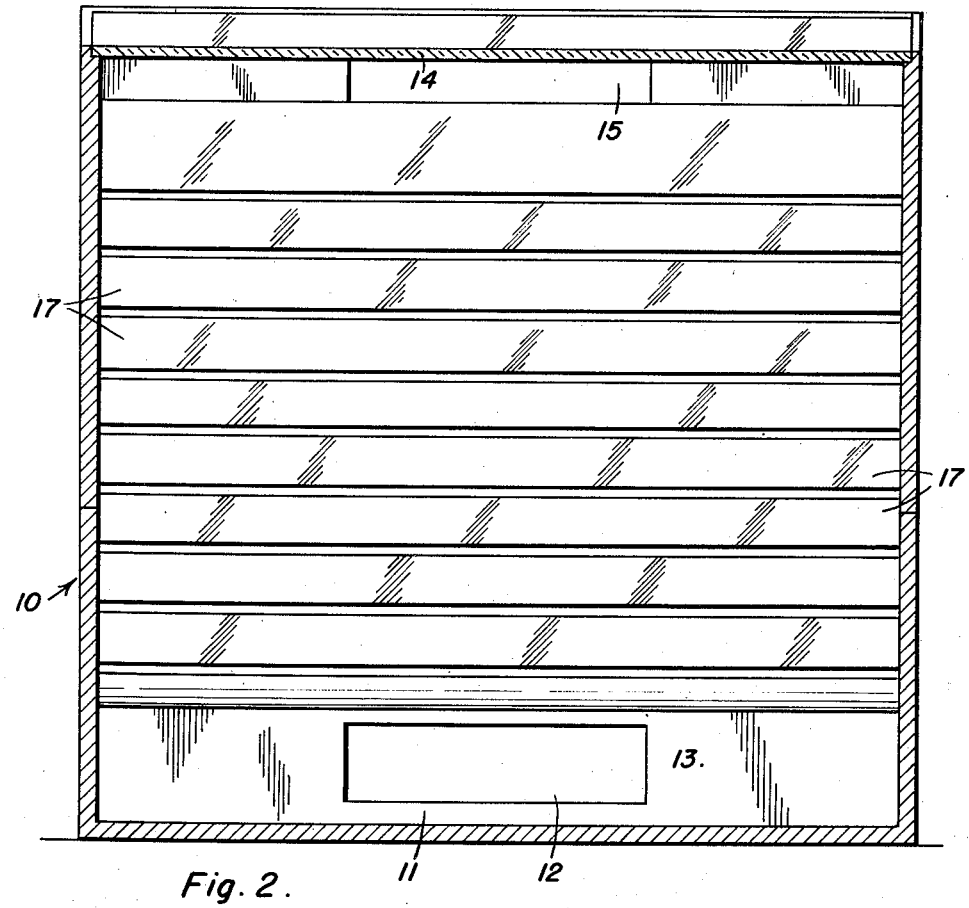
Figure 2 is an enlarged section taken on the line 2—2 of Figure 1.
Figure 4:
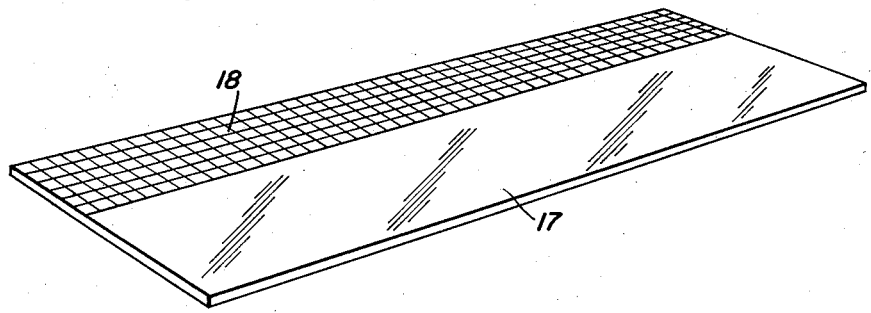
Figure 4 is a perspective view of a heating sheet or layer of glass partially black and partially clear.

Referring to the drawings in detail, in which like reference characters refer to corresponding parts throughout the several views, 10 indicates an inclined wood or metal box forming a trap, which is relatively shallow and of large dimensions in length and width and which is airtight. The trap or box has a vertical bottom extension 11 at its lower end and, an inlet at the bottom indicated at 12 and located at the back of the extension 11. The bottom 13 of the box or trap is preferably of insulating material and the top 14 is of clear glass. The upper end is provided with an outlet or duct 15 and the box or trap is supported on a frame 16 mounted on a floor or roof.

The heating element is composed of layers 17 in spaced stepped relation, preferably ten or more in number, or otherwise as desired, and consisting of bottom layers of glass painted black at their upper, overlapping portions, as indicated at 18, or composed of copper sheets. The two upper layers are preferably clear, especially where the upper layers overlap the opaque layers thereBeneath, so as to better absorb and reflect the heat of the sun's rays and to heat the air passing through the trap or box from the inlet 12 to the outlet 15. Leading from the outlet 15 and connected thereto in a suitable manner is a flue or outlet passage 19 for the heated air in which is disposed a vertically pivoted damper 20 thermostatically controlled through the medium of a bimetallic member or spring 21 to open when the air is hot and to close when the air is cold.

The outlet or flue pipe 19 leads to a heat exchanger 22 consisting of a number of heating pipes arranged transversely with respect to said outlet or flue pipe and preferably disposed vertically around which the hot air may circulate so as to heat water circulating through the coils. Heat exchanger 22 forms part of a circulating system the upper end of which is provided with an outlet 23 near the top and an inlet 24 at the bottom for cold water contained in a tank 25 which is provided with a cold water inlet pipe 26 from a source of supply under pressure detachably coupled in position and leading to the bottom portion of the tank 27. The tank also has a hot water outlet 28 leading from the top thereof and also detachably coupled in position, leading to suitable faucets for domestic use. The tank may be provided within an outer jacket 29 of metal or otherwise, between which and the tank is disposed suitable insulation 30 to retain the water in the tank in a heated condition. The tank and jacket may be supported upon a suitable platform 31 mounted upon a support or stand 32. Also, if desired, the hot air pipe 19 may be provided with a return pipe 33 leading from the bottom thereof at the circulating hot water coil or radiator 22 which is mounted in an enlarged chamber 34 at this point in order to better heat the water. The return pipe 33 leads downwardly and then into the inlet 12 for air so that the heated air may circulate through the trap or solar heater containing the glass or sheet elements 17 heretofore described, and which may be of copper sheets, especially the lower ones, instead of being partially painted black as heretofore described.

From the foregoing, it will be seen that I have provided a simple and desirable form of solar heater for heating air from the sun's rays, the air circulating through the heater in order to heat water for domestic use, or to provide other uses thereof such as in connection with hot air heating systems, refrigeration, or the like in an efficient and economical manner. Another important feature of the invention is the fact that the outlet for air from the heating element will close when the circulating air is cold, and will open when the same is hot, so as to supply the air to the radiator or heater only when it is hot, thereby preventing cooling of the water when the air is not properly heated.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A solar heater comprising a box with a transparent cover portion inclined toward the horizontal, a series of spaced parallel heat absorption sheets partly transparent and partly covered with a heat absorbing layer, said heat absorption sheets being arranged one above the other in a stepped relationship along a zone subdividing the box substantially into two sections communicating with each other by passages formed by the spaces left between adjacent absorption sheets, the transparent portion of each sheet covering the portion of the sheet located underneath which is covered with the heat absorbing layer, an air inlet in communication with one of the subdivisions of the box, and an air outlet in communication with the other subdivision of the box, a water heating system and means for transmitting the heat carried by the air, circulating between the outlet and inlet of the box, to said water heating system.

2. A solar heater comprising a box with a transparent cover portion and with a parallel bottom portion, both inclined toward the horizontal, a series of closely adjacent spaced, partly transparent and partly opaque heat absorption sheets, arranged one above the other in a stepped relationship, each sheet overlapping a portion of the sheet underneath, the entire series of absorption sheets being arranged in a zone running diagonally through the box and inclined toward the horizontal, said series of absorption sheets subdividing the box substantially into two sections communicating by the passages left between adjacent absorption sheets thus exposing the volume of the air circulating between the sections of the box to the action of the heat absorption sheets, an inlet opening in one section of the box, an outlet opening in the second section of the box, a closed air circulation system outside the box between the air inlet and the air outlet, a water heating system, a heat exchanger forming part of said water circulating system arranged within the air circulating system for transmitting the heat acquired by the air circulating in the air circulating system to the heat exchanger of the water circulating system.

3. A solar heater comprising a box with a transparent wall, inclined toward the horizontal at a predetermined angle, a series of spaced parallel, partly transparent heat absorption sheets arranged one above the other and overlapping each other in a stepped relation, said absorption sheets being further arranged in substantial parallelism to the transparent wall of the box and aligned along a diagonal plane of the box subdividing the latter substantially into two sections, said transparent portions of each heat absorption sheet covering the heat absorbing portion of the absorption sheet beneath it, the spaces between the absorption sheets forming passageways extending substantially along one plane for transmitting heat from the adjacent heat absorption sheets to the circulating air, an air intake means at the lower end of the box, an air discharge means at the upper end of said box to produce a continuous circulation of the air, the circulating air within said box being divided into a plurality of thin air streams spread over large heated surfaces for effective heat transmission during circulation through said box.

4. A solar heater comprising a box with a transparent cover portion, inclined toward the horizontal, a series of spaced, parallel heat absorption sheets, partly transparent and partly covered with a heat absorbing layer, said heat absorption sheets being arranged one above the other in a stepped relationship along a zone subdividing the box substantially into two sections communicating with each other by the passages between the absorption sheets, the transparent portion of each sheet covering the portion of the sheet located underneath which is covered by the heat absorbing layer, an air inlet in communication with one section of the box, an air outlet in communication with the other section of the box, a closed air circulation system outside the box between said air inlet and said air outlet including a chamber and a heat exchanger consisting of pipes arranged within said chamber, and a water storage and circulating system including a tank, a pipe system connected with said tank and the pipes of said exchanger, means for feeding cold water to said tank and means for withdrawing warm water from said tank.

ROY EVERETT BARNETT.

REFERENCES CITED

The following references are of record in the file of this patent:

UNITED STATES PATENTS

| Number | Name | Date |
|---|---|---|
| 102,633 | Wheeler, et al. | May 3, 1870 |
| 117,476 | Sperry | July 25, 1871 |
| 201,439 | Moreau | Mar. 19, 1878 |
| 246,626 | Morse | Sept. 6, 1881 |
| 430,762 | Taylor | June 24, 1890 |
| 681,095 | Baker | Aug. 20, 1901 |
| 842,788 | Huntoon | Jan. 29, 1907 |
| 965,391 | Little | July 26, 1910 |
| 984,585 | McHenry | Feb. 21, 1911 |
| 1,158,175 | Cherrier | Oct. 26, 1915 |
| 1,814,897 | Coxe | July 14, 1931 |
| 2,064,345 | Hodgson | Dec. 15, 1936 |
| 2,469,496 | Christenson | May 10, 1949 |

FOREIGN PATENTS

| Number | Country | Date |
|---|---|---|
| 373,811 | Germany | Apr. 16, 1923 |
| 529,163 | France | Sept. 3, 1921 |